US006405807B1

(12) United States Patent
Pan

(10) Patent No.: US 6,405,807 B1
(45) Date of Patent: Jun. 18, 2002

(54) ALTERNATING DIRECT CURRENT MULTIPURPOSE COMBINATION TOOL

(75) Inventor: Ya Ping Pan, Shanghai (CN)

(73) Assignee: Shanghai Xing Te Hao Industrial Co., Ltd., Shanghai (CN)

( * ) Notice: Subject to any disclaimer, the term of this patent is extended or adjusted under 35 U.S.C. 154(b) by 0 days.

(21) Appl. No.: 09/595,820

(22) Filed: Jun. 16, 2000

(30) Foreign Application Priority Data

Sep. 1, 1999 (CN) .......................................... 99251914

(51) Int. Cl.[7] ............................................... B23B 31/07

(52) U.S. Cl. ....................... 173/217; 173/104; 173/216; 173/178

(58) Field of Search ................................ 173/216, 217, 173/132, 104, 48, 178; 279/19.3, 19.1, 19.5, 19.4, 75, 405

(56) References Cited

U.S. PATENT DOCUMENTS 3,730,281 A * 5/1973 Wood .......................... 173/48
4,091,880 A * 5/1978 Troutner et al. ............ 173/217
4,702,485 A * 10/1987 Rohm ....................... 279/19.4
5,350,026 A * 9/1994 Markus et al. .............. 173/178
5,738,177 A * 4/1998 Schell et al. ................ 173/178
6,089,330 A * 7/2000 Miescher et al. ........... 173/132
6,241,026 B1 * 6/2001 Wache et al. ................. 279/75
6,257,351 B1 * 7/2001 Ark et al. ................... 173/217
6,315,060 B1 * 11/2001 Schuda et al. .............. 173/132

* cited by examiner

*Primary Examiner*—Scott A. Smith
(74) *Attorney, Agent, or Firm*—Akin Gump Strauss Hauer & Feld, LLP

(57) ABSTRACT

A multipurpose combination tool comprises a main body portion with a motor and drive shaft, and an interchangeable tool head portion that can be removably coupled to the main body portion through a locking mechanism and power transmission device for transmitting power from the main body portion to the tool head portion. The locking mechanism includes a thrust ring, a locking ring and a locking pad operably associated with the main body portion and a locking head operably associated with the tool head portion. The power transmission device comprises an internal spline on the main body portion that meshes with an external spline on the tool head portion. In this manner, the tool head portion associated with one task, such as drilling, can be changed for other tool head functions associated with other tasks, such as sanding, grinding, mixing, sawing, and so on to thereby provide multiple tasking with one machine.

5 Claims, 7 Drawing Sheets

ALTERNATING DIRECT CURRENT MULTIPURPOSE COMBINATION TOOL

FIELD OF THE INVENTION

The present invention relates in general to electrical power tools, and more particularly to a multipurpose alternating, direct current combination tool with a main body portion connectable to different types of interchangeable tool head portions.

BACKGROUND OF THE INVENTION

The electric tool is a common tool with very widespread applications in households and factories. In the past, it has often been necessary to purchase multiple tools in order to perform multiple processes or tasks such as drilling, planing, shearing, grinding, and like, resulting in high purchase cost and carrying inconvenience. In order to overcome the drawbacks of high purchase expense and carrying inconvenience, many patents and documents have covered various forms of combination electric tools.

Chinese Patent No. ZL93220617.4, for example, discloses a type of electric tool assembly, wherein a main machine part of an electric motor is coupled with multiple different tool heads to drive different kinds of tools, so as to provide multipurpose functioning with one machine. However, that patent does not disclose how the tool head is coupled with the main machine part.

Chinese Patent No. ZL96217802.0 discloses a universal electric tool wherein two spring-biased round head pins are provided on the output shaft of an electric motor to couple the tool with the tool head. Although this arrangement is very convenient for replacing tool heads, the power transmission between the motor and tool head is through two contact points on the two round head pins. Hence, the power transmission efficiency will be affected to a certain degree and, due to repeated mounting and dismounting, the round head pins may become worn, and may result in injury to users.

Chinese Patent No. ZL97201237.0 discloses a combination type multipurpose electric tool, and sets forth a method of coupling the main machine part with a tool head. It can be noted from the technique disclosed by that patent, that the main machine part and tool head utilize male and female screw threads to make the coupling. This kind of coupling method is very inconvenient when replacing tool heads, and may easily damage the output shaft or electric motor.

It can be noted from the above-mentioned prior art that the coupling and power transmission of the main body with the tool head of multipurpose combination electric tools have disadvantages associated with their method of coupling and power transmission, and may cause injury to users. Hence, there continues to be a need for a multipurpose combination electric tool that is safe, reliable, and performs for users at an acceptable level of expectation.

OBJECTIVE OF THE INVENTION

It is an object of the present invention to provide a multipurpose combination electric tool with a locking mechanism for coupling a main body portion with a tool head portion to overcome the above-mentioned drawbacks of the prior art. The combination electric tool may be adapted to receive alternating and/or direct current.

SUMMARY OF THE INVENTION

The present invention divides the existing electric power tool into a main body portion and a tool head portion. The main body portion includes an electric motor, a speed control switch, a battery or other power source, and the like components. The tool head portion includes a speed control device, a direction change device, a transmission mechanism and the like components. The above-mentioned components are known in the prior art and therefore will not be further described.

According to the invention, the main body portion couples with the tool head portion through a locking mechanism and a power transmission device for transferring power from the main body portion to the tool head portion.

The locking mechanism comprises a thrust ring provided on the main body portion that is rotatable over a preset distance and a locking head provided on the tool head portion. A locking ring and a locking pad are also provided on the main body portion and are operably associated with the thrust ring.

The thrust ring is an annular ring with an outside rim and thrust ring levers extending from the outside rim and out of the housing of the main body portion. At least one fixing element is located on the thrust ring for fixing the locking ring against relative rotation. The outside diameter of the thrust ring should be sized to be received within the housing of the main body portion, so as to enable the thrust ring to rotate inside the housing.

The locking ring is an annular ring with an inner rim and inclined wedges provided on the inner rim. When the thrust ring is rotated, the locking ring can also rotate therewith due to the at least one fixing element.

The locking pad is an annular ring that is located adjacent one side of the locking ring. Bosses are provided on the annular ring and are inserted into slots in the housing of the main body portion to fix the locking pad to the housing.

A washer can be provided between the locking ring and locking pad for adjusting clearance.

The thrust ring, locking ring, locking pad and washer are all provided on a forward end portion of the main body portion and sleeved at the outer side of the electric motor output shaft.

The locking head is located at the rear end portion of the tool head portion and includes coupling lugs and a wedging slot located forward of the coupling lugs. The wedging slot receives the inclined wedges of the locking ring during rotation of the locking ring in one direction to tightly couple the main body portion with the tool head portion. Likewise, the inclined wedges of the locking ring can be removed from the wedging slot during rotation of the locking ring in the opposite direction to separate the main body portion from the tool head portion.

The power transmission device comprises an external spline fixed on the output shaft of the electric motor and an internal spline located inside the tool head portion. The internal and external splines are provided with guiding faces to mate with each other. In use, the internal spline is inserted through cooperation of the guiding faces into the external spline to transmit power from the output shaft to the tool head portion.

The present invention can form different tools with a single main body portion and different interchangeable tool head portions by merely changing one tool head portion for another. The tool head portions can be in the form of an electric drill head assembly to be rapidly used as an electric drill; the tool head portion can be in the form of a triangular sanding head assembly to be used as a sanding machine; the tool head portion can be in the form of an angular grinding machine head assembly to be used as angular grinding machine; the tool head portion can be in the form of a cement or concrete is mixing assembly to be used as a cement or concrete mixing machine; the tool head portion can be in the form of a reciprocating-type sawing machine to be used as reciprocating sawing machine, and so on. The various tool head portions mentioned above are well known and, in accordance with the present invention, can be easily connected to and disconnected from the main body portion.

BRIEF DESCRIPTION OF THE DRAWINGS

These and other features of the present invention will be described in conjunction with the drawings, wherein.

DETAILED DESCRIPTION OF THE INVENTION

Figure 1:
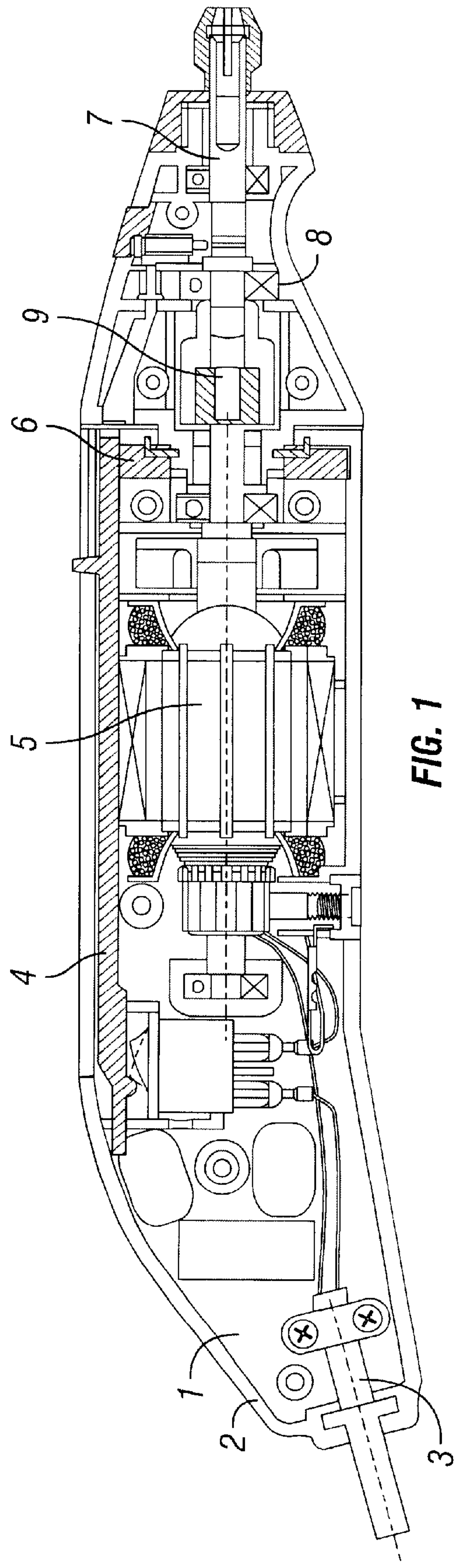
FIG. 1 is a side elevational view in partial cross section of an electric power tool according to the invention having a main body portion and a tool head portion.

The accompanying drawings show an exemplary embodiment of the present invention. With particular reference to FIG. 1, an electric power tool comprises a main body portion 1 and a tool head portion 7 that are mutually connectable and disconnectable. The main body portion 1 serves as a power source or driver for the tool head portion 7, while the tool head portion 7 can include various tool head structures for sawing, mixing, grinding and the like, as known in the prior art. The main body portion 1 includes a power source 3, a switch 4, and an electric motor 5. In accordance with the present invention, the tool head portion 7 couples with the main body portion 1 through a locking mechanism 6. A transmission device 9 is provided for transmitting power from the main body portion 1 to the tool head portion 7.

Figure 2:
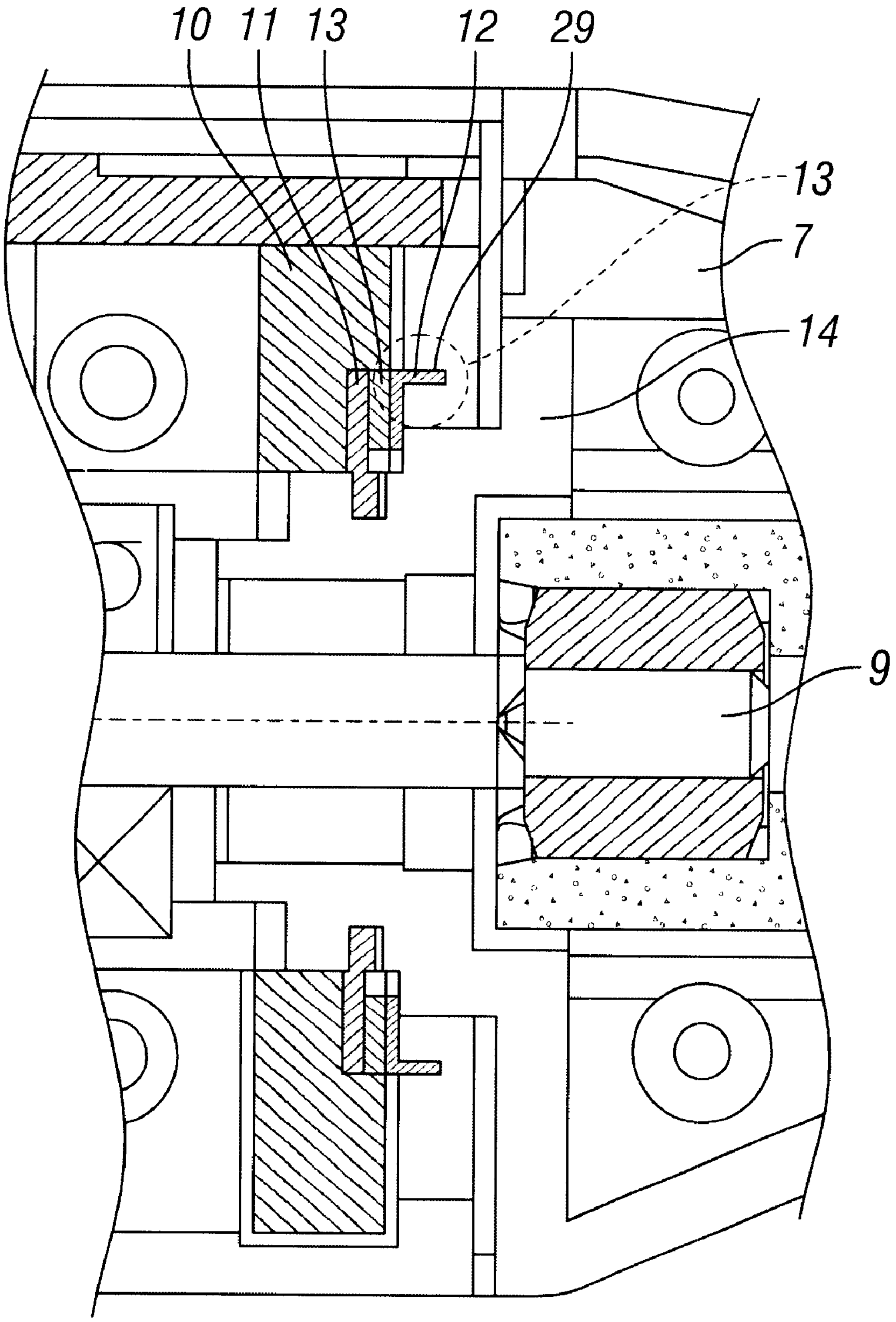
FIG. 2 is an enlarged sectional view of a locking mechanism according to the invention for use with the power tool.

As shown in FIG. 2, the locking mechanism 6 comprises a thrust ring 10, a locking ring 11, a locking pad 12 and a washer 13 provided on the main body portion 1, and a locking head 14 provided inside the tool head portion 7.

Figure 3:
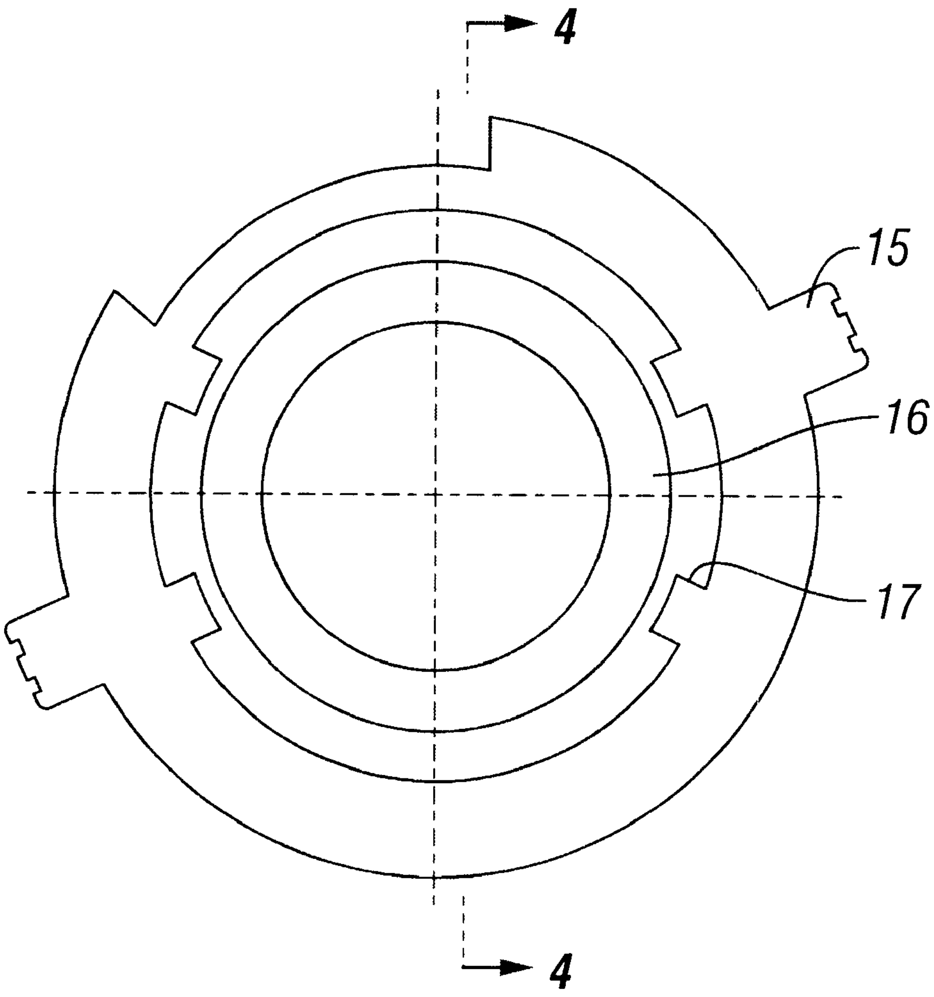
FIG. 3 is a front elevational view of a thrust ring that forms part of the locking mechanism of FIG. 2.
Figure 4:
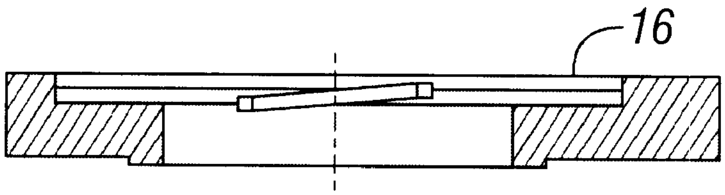
FIG. 4 is a sectional view of the thrust ring taken along line 4—4 of FIG. 3.

As shown in FIGS. 3 and 4, the thrust ring 10 is provided with two thrust ring levers 15 that extend out of the housing 2 of the main body portion 1. The thrust ring 10 includes a step 16 and four fixing tabs 17. The outside diameter of the thrust ring 10 is dimensioned to fit within the housing 2 so as to enable rotation of the thrust ring 10 inside the housing.

Figure 5:
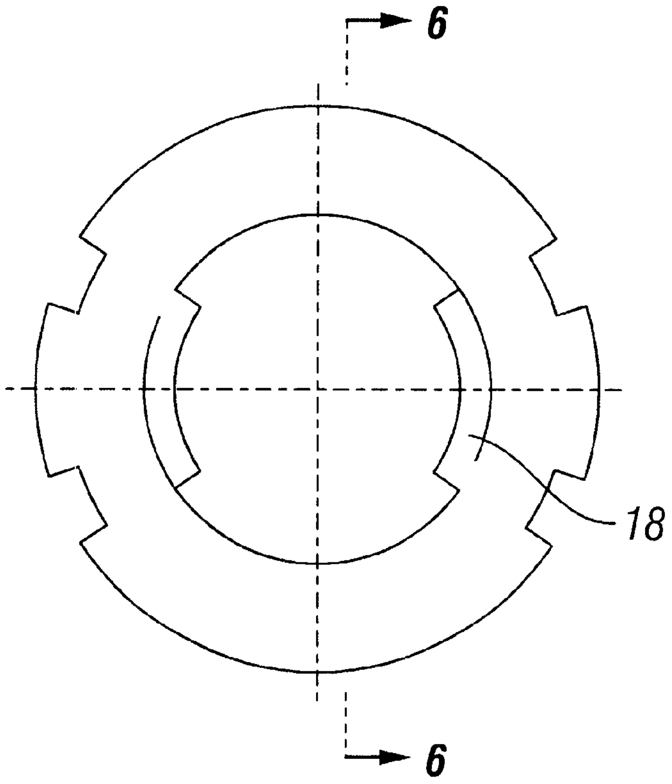
FIG. 5 is a front elevational view of a locking ring that forms part of the locking mechanism of FIG. 2.
Figure 6:
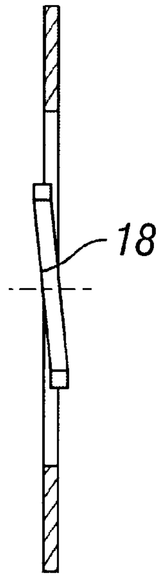
FIG. 6 is a sectional view of the locking ring taken along line 6—6 of FIG. 5.

As shown in FIGS. 5 and 6, the locking ring 11 includes a pair of inclined wedges 18. The locking ring 11 is dimensioned to be received in the step 16 of the thrust ring 10. The fixing tabs 17 on the thrust ring 10 are received in slots formed in the locking ring 10 to thereby fix the rings together against mutual rotation. In this manner, rotation of the thrust ring 11 also causes rotation of the locking ring 10.

Figure 7:
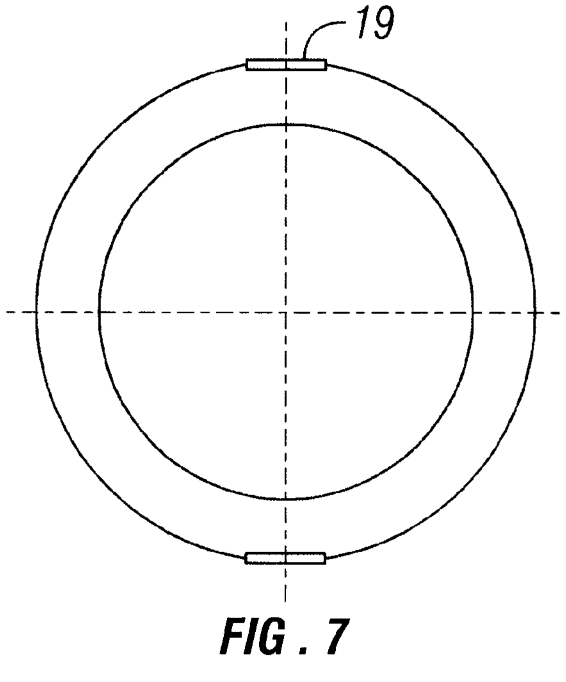
FIG. 7 is a front elevational view of a locking pad that forms part of the locking mechanism of FIG. 2.
Figure 13:
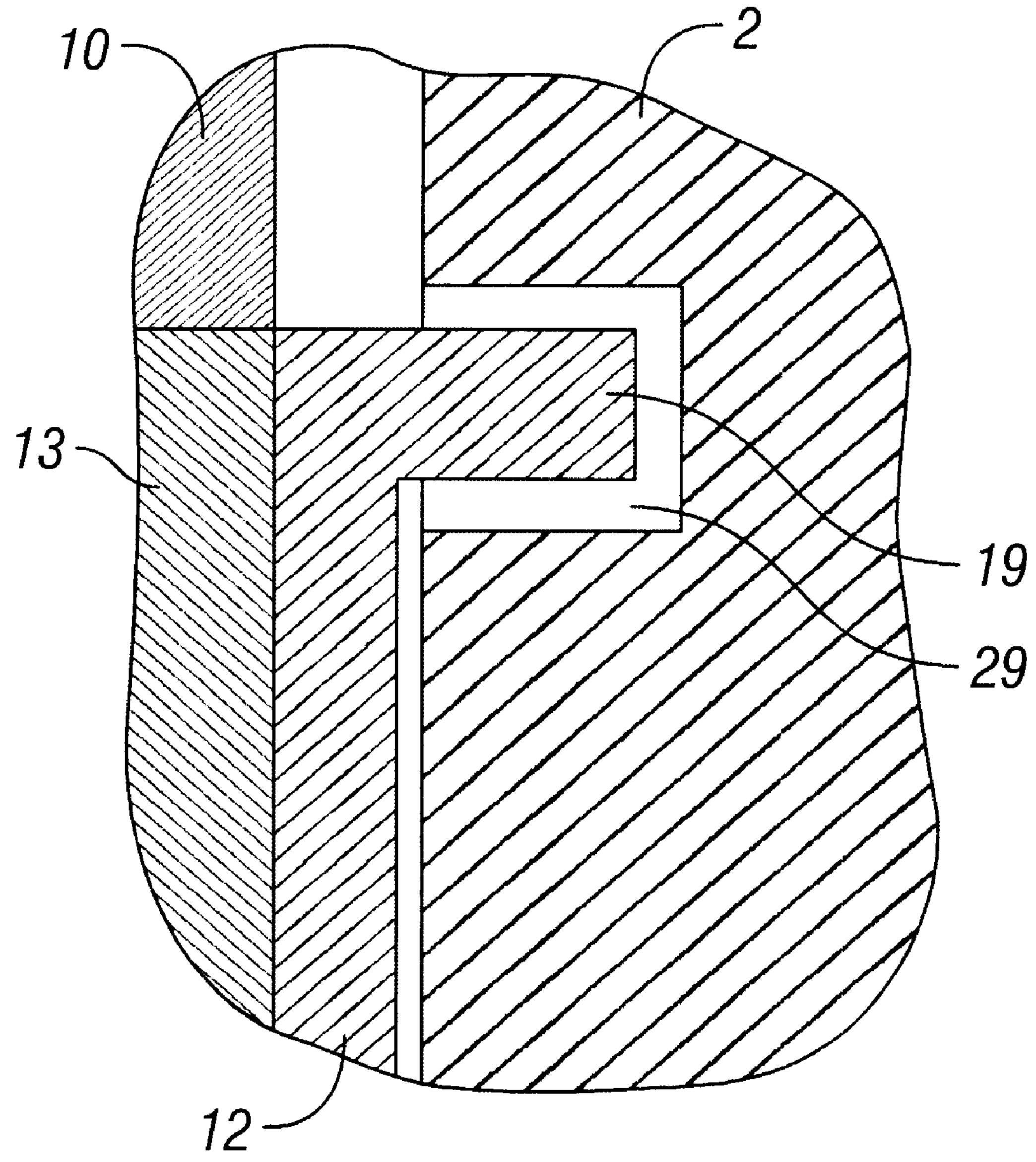
FIG. 13 is an enlarged view of section 13 shown in dashed line in FIG. 2.

As shown in FIGS. 7 and 13, the locking pad 12 includes a pair of bosses 19. The bosses 19 are received in slots 29 formed in the inner wall of the housing 2 of the main body portion 1 during assembly, in order to fix the locking pad 12 to the main body portion 1.

A washer 13 can be provided between the locking ring 11 and locking pad 12 for adjusting clearance, and simultaneously for acting as a clamping plate to simplify the locking process and reduce the frictional force with the locking pad 12.

The thrust ring 10, locking ring 11, locking pad 12 and washer 13 are all provided at the outer side of the electric motor output shaft of the main body portion 1.

Figure 8:
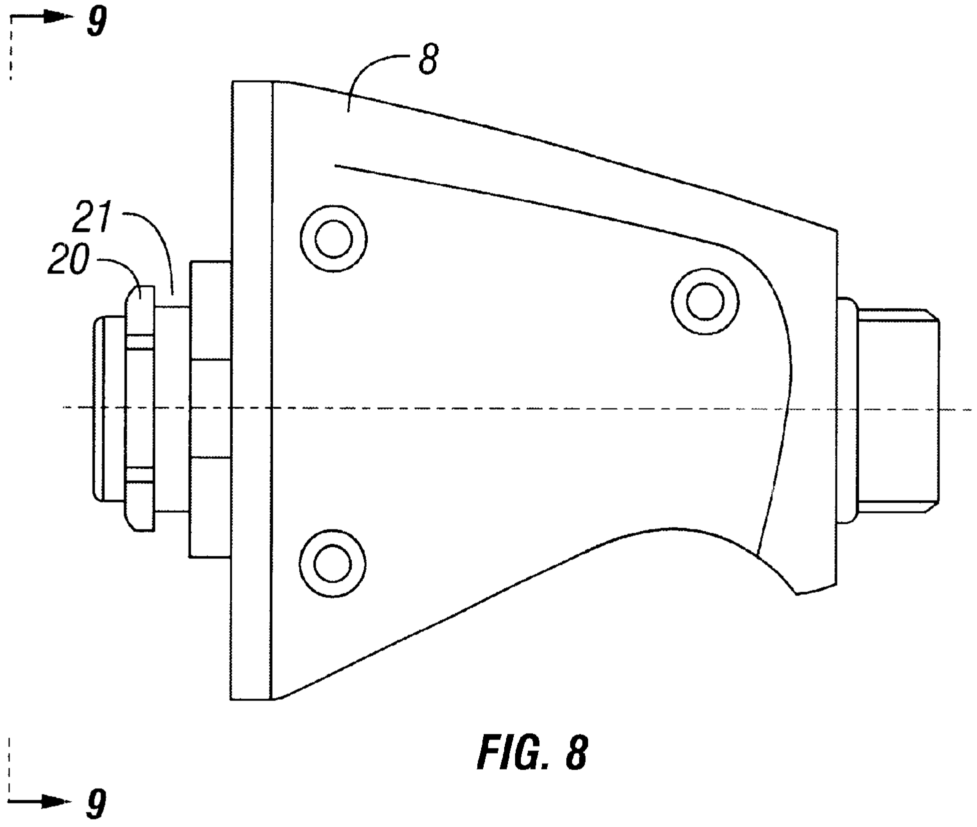
FIG. 8 is a side elevational view of a tool head portion according to the present invention.
Figure 9:
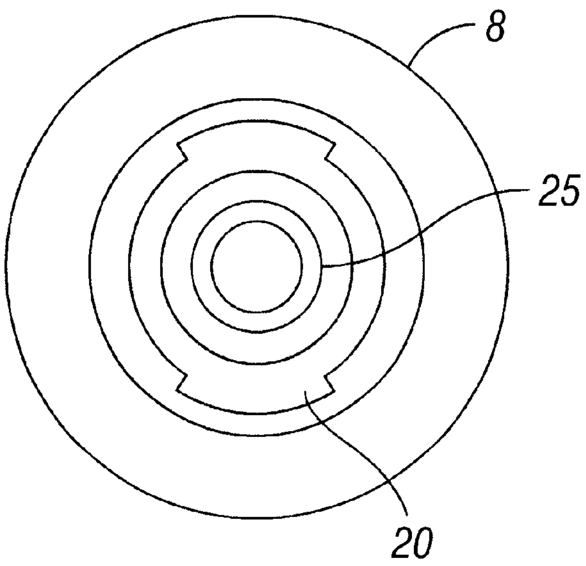
FIG. 9 is a rear elevational view of the tool head portion as viewed from line 9—9 in FIG. 8.

As shown in FIGS. 8 and 9, the locking head 14 is provided at the rear end portion of the housing 8 of the tool head portion 7. The locking head 14 includes a pair of coupling lugs 20 and a wedging slot 21 located forward of the coupling lugs. The wedging slot 21 receives the inclined wedges 18 of the locking ring 11 during relative rotation between the locking ring and locking head 14 in a first direction to thereby secure the main body portion 1 with the tool head portion 7. During relative rotation between the locking ring 11 and locking head 14 in a second direction opposite the first direction, the inclined wedges 18 leave the wedging slot 21 to thereby disconnect the main body portion 1 from the tool head portion 7.

Figure 10:
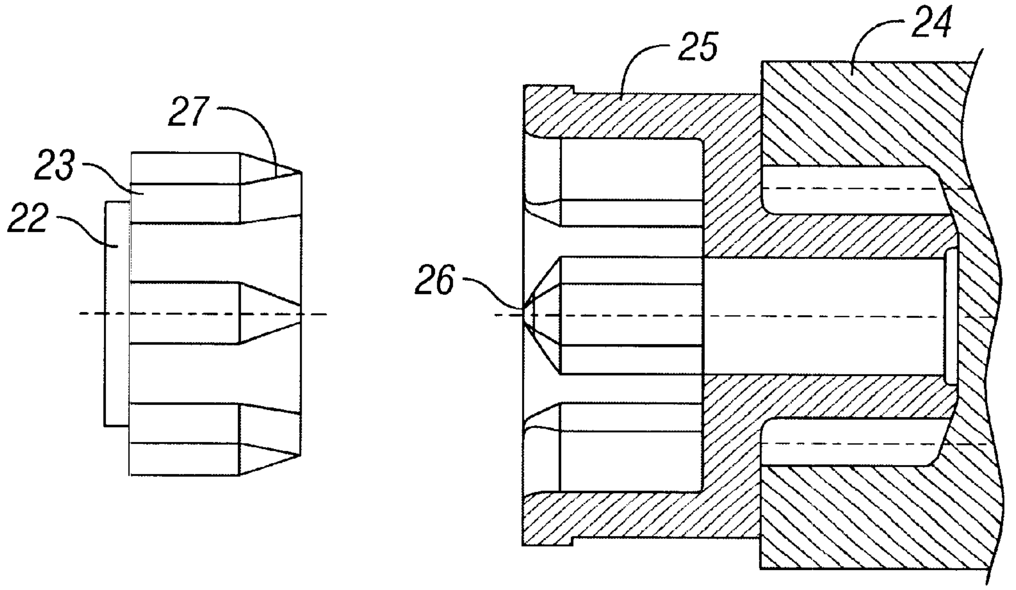
FIG. 10 is a side elevational view of an external spline associated with the main body portion and a sectional view of an internal spline associated with the tool head portion and illustrating their manner of mutual engagement.

As shown in FIG. 10, the power transmission device 9 comprises an external spline 23 on the output shaft 22 of the electric motor 5 and an internal spline 25 connected to a transmission mechanism 24 inside the tool head portion 7. The external spline 23 is provided with guide faces 27, and the internal spline 25 is provided with guide faces 26, such that the internal and external splines can be easily meshed or combined together at any random position during connection of the tool head portion 7 to the main body portion 1. Preferably, the number of keyways for the above-mentioned internal and external splines is approximately five to seven.

Figure 11:
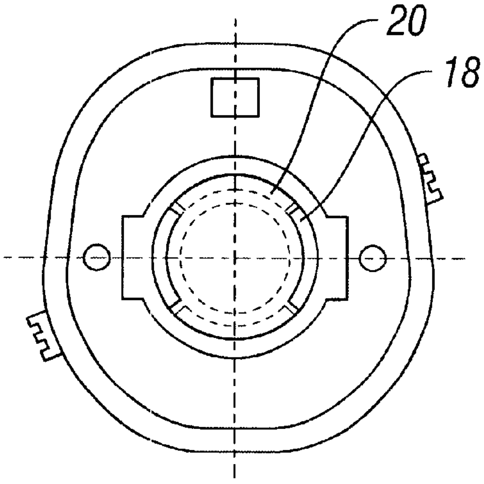
FIG. 11 is a front elevational view showing the main body portion and the tool head portion in a released or disconnected position.

FIG. 11 is a schematic diagram of the tool head portion and main body portion in an unlocked position wherein the wedges 18 are disconnected from the coupling lugs 20.

Figure 12:
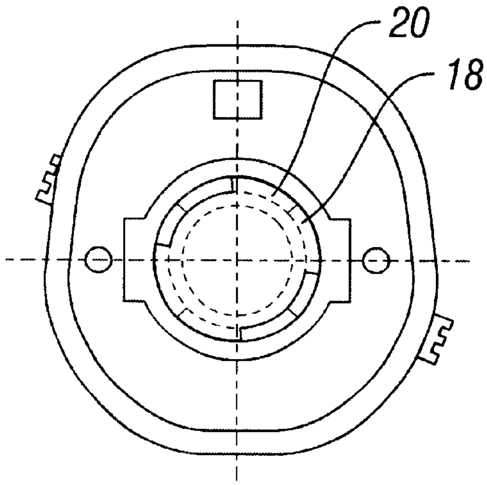
FIG. 12 is a front elevational view similar to FIG. 11 showing the main body portion and the tool head portion in a connected or locked position.

FIG. 12 is a schematic diagram of the tool head portion and main body portion in a locked position wherein the wedges 18 are located in the wedging slot 21 forward of the coupling lugs 20.

It can be clearly seen from the above disclosure that the multipurpose electric tool of the present invention is advantageous over the single purpose performance of prior art electric tools by obtaining multiple uses with a single machine having a main body portion and different interchangeable tool head portions that are convenient to connect with and disconnect from the main body portion in a safe and reliable manner, thereby resulting in a power tool that is convenient and easy to carry for users.

What is claimed is:

1. A multipurpose combination tool, comprising:

a main body portion (1) having a housing (2) and an electric motor (5) with an output shaft (22) associated with the housing (2);

a tool head portion (7) including a transmission mechanism (24);

a locking mechanism (6) comprising:

a thrust ring (10) located on the main body portion (1), the thrust ring (10) having a pair of thrust ring levers (15) extending out of the main body housing (2), the thrust ring (10) including at least one fixing element;

a locking ring (11) located on the main body portion (1), the locking ring (11) including a pair of inclined wedges (18), the locking ring (11) being fixed on the thrust ring (10) through the at least one fixing element on the thrust ring (10);

a locking pad (12) located on the main body portion (1), the locking pad (12) including a pair of bosses (19) that are inserted into the housing (2) of the main body (1);

a washer (13) provided on the main body portion (1); and a locking head (14) provided on a rear end portion of the tool head portion (7), the locking head (14) including a pair of coupling lugs (20) and a wedging slot (21) located forwardly of the coupling lugs (20), the inclined wedges of the locking ring (11) being releasably insertable into the wedging slot (21) to thereby connect the main body portion to the tool head portion; and a power transmission device (9) comprising:

an external spline (23) located on the output shaft (22) of the electric motor (5), the external spline having guiding faces (27); and an internal spline located on the transmission mechanism (24), the internal spline (25) having guided faces (26) engageable with the guiding faces (27), the internal spline (25) being insertable into or separable from the external spline (23).

2. A multipurpose combination tool according to claim 1, wherein the washer (13) is provided between the locking ring (11) and locking pad (12).

3. A multipurpose combination tool according to claim 2, wherein the internal spline (24) and external spline (23) each comprises approximately five to seven keyways.

4. A multipurpose combination tool according to claim 1, wherein the internal spline (24) and external spline (23) each comprises approximately five to seven keyways.

5. A multipurpose combination tool according to claim 1, wherein the tool head portion (7) is at least one of an electric drill, a sanding machine, an angular grinding machine, a cement or concrete mixer, and a sawing machine.

* * * * *